(12) United States Patent
Chester et al.

(10) Patent No.: US 9,122,993 B2
(45) Date of Patent: *Sep. 1, 2015

(54) PARALLEL MULTI-LAYER COGNITIVE NETWORK OPTIMIZATION

(71) Applicant: HARRIS CORPORATION, Melbourne, FL (US)

(72) Inventors: David B. Chester, Palm Bay, FL (US); Jerome Sonnenberg, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/753,592

(22) Filed: Jan. 30, 2013

(65) Prior Publication Data

US 2014/0214741 A1 Jul. 31, 2014

(51) Int. Cl.
*G06N 5/02* (2006.01)
*G06N 5/04* (2006.01)

(52) U.S. Cl.
CPC ............................. *G06N 5/043* (2013.01)

(58) Field of Classification Search
CPC ........................................... G06N 5/02
USPC ............................................ 706/46
See application file for complete search history.

(56) References Cited

U.S. PATENT DOCUMENTS

| | | |
|---|---|---|
| 7,295,956 B1 | 11/2007 | Ruetsch |
| 7,664,622 B2 | 2/2010 | Ruetsch |
| 7,742,902 B1 | 6/2010 | Ruetsch |
| 7,975,036 B2 | 7/2011 | Shyy et al. |
| 2008/0215512 A1 | 9/2008 | Narzisi et al. |
| 2010/0135226 A1 | 6/2010 | Chandramouli et al. |
| 2014/0214741 A1 | 7/2014 | Chester et al. |
| 2014/0214743 A1 | 7/2014 | Chester et al. |

OTHER PUBLICATIONS

Srivastava, V., et al, "Cross Layer Design: A Survey and the Road Ahead", IEEE Communications Magazine, Dec. 2005, vol. 43, Issue 12.

(Continued)

*Primary Examiner* — Jeffrey A Gaffin
*Assistant Examiner* — Ola Olude Afolabi
(74) *Attorney, Agent, or Firm* — Robert J. Sacco, Esq.; Fox Rothschild LLP (57) ABSTRACT

System (300) and methods (400, 600) for providing a Cognitive Network ("CN"). The methods involve: partially solving Multi-Objective Optimization Algorithms ("MOOAs") for Protocol Stack Layers ("PSLs") using initialization parameters generated based on project requirements (572); and monitoring the convergence behaviors of MOOAs (584) to identify when solutions (106) thereof start to converge toward Pareto-Optimal solutions (104). In response to said identification, a convergence of a solution trajectory for at least one MOOA is "biased" so that compatible non-dominated solutions are generated at PSLs. A Pareto Front (100) for each PSL is determined by generating remaining solutions for MOOAs. The Pareto Fronts are analyzed in aggregate to develop Best Overall Network Solutions ("BONSs"). BONSs are ranked according to a pre-defined criteria. A Top Ranked Solution ("TRS") is identified for BONSs that complies with current regulatory/project policies. Configuration parameters are computed for PSL protocols that enable implementation of TRS within CN.

22 Claims, 6 Drawing Sheets

(56) References Cited

OTHER PUBLICATIONS

Information about Related Patents and Patent Applications, see section 6 of the accompanying Information Disclosure Statement Letter.

Amanna, Ashwin and Jeffrey H. Reed, "Survey of Cognitive Radio Architectures," IEEE SoutheastCon 2010 (SoutheastCon), Proceedings of the, IEEE, 2010.

Clancy, Charles, et al. "Applicants of Machine Learining to Cognitive Radio Networks," Wireless Communications, IEEE 14.4 (2007): pp. 47-52.

Fette, Bruce A., ed. "Cognitive Radio Technology," Acedemic Press, 2009.

Mitola, Joseph, "Cognitive Radio Architecture Evolution," Proceedings of the IEEE 97.4 (2009): pp. 626-641.

Mostaghim, Sanaz, and Jurgen Teich, "Covering Pareto-Optimal Fronts by Subswarms in Multi-Objective Particle Swarm Optimization," Evolutionary Computation, 2004, CEC2004, COngress on , vol. 2, IEEE, 2004.

Horn, Jeffrey, et al., "Multiobjective Optimization Using the Niched Pareto Genetic Algorithm," IlliGAL report 93005 (1993): pp. 61801-62296.

Sonnenberg, Jerome, et al., "Quantifying the Relative Merits of Genetic and Swarm Algorithms for Network Optimization in Cognitive Radio Networks," Military Communications Conference, 2012-MILCOM 2012, IEEE, 2012.

(Prior Art)

PARALLEL MULTI-LAYER COGNITIVE NETWORK OPTIMIZATION

STATEMENT OF THE TECHNICAL FIELD

The inventive arrangements relate to cognitive networks. More particularly, the inventive arrangements concern implementing systems and methods for providing a parallel multi-layer cognitive network optimization.

DESCRIPTION OF THE RELATED ART

With the explosion of wireless data technologies and wireless based products/services leading to virtually insatiable demand for bandwidth, assigned spectrum under a traditional command and control regulatory model has become exhausted. As a result, a National Broadband Initiative ("NBI") was started. The NBI calls for the re-allocation of 500 MHz of bandwidth from government use to commercial/civilian use by the end of the decade. In accordance with NBI, the military will have to vacate some of the bands which they have traditionally used for communications. There are two approaches that the military can take to adjust their communications systems accordingly.

A first approach involves modifying some of the military's Radio Frequency ("RF") systems such that they operate in new spectral bands. The system modification can be achieved via static relocation. Static relocation is well known in the art, and therefore will not be described herein. There are two problems with a static relocation. The first problem is that certain bands are already critically over utilized. Any static relocation would either preserve the status quo or exacerbate the over utilization. The second problem is that multiple re-designs may be necessary when the band selected for relocation is subsequently re-allocated.

A second approach involves modifying the RF systems such that they comprise cognitive RF systems. This modification can be achieved by: moving from command/control based regulation to policy based regulation; and putting machine intelligence and spectral sensing in the RF devices to allow those devices to locate and utilize spectral "white spaces" (i.e., unused spectrum) on an as available basis and in compliance with the policies of the local governing bodies.

Cognitive communications can be used to coordinate the activities of other cognitive RF devices and networks of cognitive devices. The cognitive devices can include, but are not limited to, cognitive radars, cognitive sensors, cognitive jammers, and cognitive radios. Each cognitive radio uses cognitive technology to exclusively optimize its operations of a physical layer and/or a data link layer of a protocol stack. In contrast, a cognitive network uses cognitive technology to optimize the performance of the entire network.

A Network of Cognitive Radios ("NCRs") is not the same thing as a cognitive network. An analogy from operations research is now discussed to demonstrate why the previous statement is true. In this regard, a protocol stack is thought of as an organization. Each protocol stack layer is thought of as a department in the organization. If one tries to optimize only one department, then the organization as a whole is sub-optimized or rendered non-functional. For example, an accounting department is told to "optimize" profits. To the accounting department in isolation that means minimize expenditures. The expenditures are minimized by not buying expensive capital equipment and costly materials, as well as not using highly paid skilled labor. As a result of such activities by the accounting department, a manufacturing department under performs because it must use low-quality equipment, materials and labor. Consequently, the organization as a whole under performs.

Conversely, the manufacturing department is told to "optimize" manufacturing operations by producing high quality products in a relatively small amount of time. In order to "optimize" the manufacturing operations, expensive equipment is purchased to minimize down time. Costly materials are purchased which are guaranteed to be without defect. Highly skilled labor is employed at premium salaries. As a result of such activities, the accounting department under performs because the products are produced with a cost that exceeds a sale price for a target market. Consequently, the organization as a whole under performs.

Similar to the two scenarios discussed above, if a physical layer confines itself to establishing high performing short distance links, then a network is forced to use a large number of hops to get data from a source device to a destination device. As a result of such activities, high latency packet congestion occurs within the network, as well as other phenomena that have detrimental effects on overall network performance.

Notably, practical cognitive radios and cognitive networks have yet to be developed and deployed. The closest "cousin" to cognitive networking currently is Traditional Cross Layer Optimization ("TCLO"). TCLO is inherently reactive since cross layer protocols are tuned based on observed sub-optimal performance. Also, TCLO is a single parameter optimization across two protocol stack layers. In TCLO, the protocol stack layers are not necessarily adjacent. Thus, a TCLO, that coordinates an encoding on the physical layer based on video encoding at an application layer, seeks just to ensure an optimal encoding scheme that maintains video quality. As a result of only optimizing the encoding scheme of the physical layer, other aspects of the video transfer are sub-optimized.

SUMMARY OF THE INVENTION

The invention concerns implementing systems and methods for providing a cognitive network. The methods involve partially solving a plurality of distributed Multi-Objective Optimization ("MOO") algorithms for a plurality of protocol stack layers using initialization parameters generated based on project or mission requirements. At least one of the MOO algorithms can include, but is not limited to, a biologically inspired particle swarm optimization algorithm. The initialization parameters can be generated using information specifying a status and constraints that apply to protocol stack layer resources of at least one network node, and/or information concerning resources that are available on each network node of the cognitive network.

While the MOO algorithms are being solved, convergence behaviors thereof are monitored to identify when solutions thereof start to converge toward Pareto-Optimal solutions. In response to such an identification, a convergence of a solution trajectory for at least a first MOO algorithm is "biased" so that compatible non-dominated solutions are generated at a plurality of protocol stack layers. The term "compatible non-dominated solutions", as used herein, refers to solutions that are not dominated by a better solution derived for a particular protocol stack layer and that are compatible with solutions generated for other protocol stack layers given a particular set of project or mission requirements. The convergence of the solution trajectory can be biased by modifying at least one problem constraint or a population of candidate solutions for the first MOO algorithm. The biasing can be performed using an Artificial Intelligence ("AI") algorithm that is independent of the distributed MOO algorithms, and based on a hierarchical prioritization of the protocol stack layers. The biasing is ceased when solution trajectories for the MOO algorithms are all in an acceptable direction.

Thereafter, a Pareto Front for each protocol stack layer is determined by generating all remaining solutions for the distributed MOO algorithms. The Pareto Fronts are then analyzed in aggregate to develop a plurality of best overall network solutions. The best overall network solutions are then ranked according to a pre-defined criteria. A top ranked solution is identified for the best overall network solutions that complies with current regulatory policies and/or project/mission policies. Subsequently, configuration parameters are computed for protocols of the protocol stack layers that enable implementation of the top ranked solution within the cognitive network. The configuration parameters are then used to configure network resources of the protocol stack layers. The configuration parameters can be dynamically changed based on changes in at least one of a project, a mission, a network topology and an operating environment.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-6. Embodiments generally relate to implementing systems and methods for providing a cognitive network. In mobile ad hoc tactical military networks or emergency service first responder networks, it is not desirable to have all of the cognitive network intelligence implemented by a single network node (e.g., a base station) because a disabling or removal of that network node would result in a failure of the entire cognitive network. Accordingly, the present invention may facilitate a cognitive networks with distributed intelligence, i.e., the intelligence is implemented by a plurality of network nodes, rather than by a single network node. Some of the network nodes include, but are not limited to, mobile network nodes. As such, these mobile network nodes are capable of operating for a practical duration with a mobile power source.

The cognitive networks of the present invention comprise cross-layer and cross-node optimization of a protocol stack to enable the network to meet dynamic project or mission requirements. Basing the cross-layer optimization of an Open System Interconnection ("OSI") protocol stack on PSO in general and on biologically inspired PSOs employing Swarm Intelligence ("SI") specifically facilitates matching essential characteristics of the base optimization method with key behavioral requirements of each protocol stack layer and inherent capability to parallelize the optimization algorithms across multiple processing elements. OSI protocol stacks, PSOs and SI are well known in the art, and therefore will not be described in detail herein. Still, a very brief discussion of an OSI protocol stack, a PSO and SI is provided below to assist a reader in understanding the present invention.

An OSI protocol stack includes a plurality of protocol stack layers for performing respective functions. The protocol stack layers include a physical layer, a data link layer, a network layer, a transport layer, a session layer, a presentation layer, and an application layer. The physical layer is generally configured to perform media, signal and binary transmission functions. The data link layer is generally configured to perform physical addressing functions. The network layer is generally configured to perform path determination and logical addressing functions. The transport layer is generally configured to perform end-to-end connection, reliability and flow control functions. The session layer is generally configured to perform inter-host communication and application session management functions. The presentation layer is generally configured to perform data representation, encryption, decryption, and data conversion functions. The application layer is generally configured to perform software application interaction functions.

PSO is generally an MOO Artificial Intelligence ("AI") based technique to finding a solution to a problem. As such, a PSO is also referred to in the art as a Multi-Objective PSO ("MOPSO"). An MOPSO technique generally involves: obtaining a population of candidate solutions ("particles"); and moving each particle in a search space with a velocity according to its own previous best solution and its group's best solution. A particle's position may be updated in accordance with the following mathematical equations (1) and (2).

$$\Delta x_{id} = \Delta x_{id} + c_1 \text{rand1}()(p_{id} - x_{id}) + c_2 \text{rand2}()(p_{gd} - x_{id}) \qquad (1)$$

$$x_{id} = x_{id} + \Delta x_{id} \qquad (2)$$

where $x_{id}$ represents a position of a particle. $\Delta x_{id}$ represents a position change of the particle. $c_1$ and $c_2$ are positive constants. rand1 and rand2 are random numbers between 0 and 1. $p_{id}$ represents a previous best solution for the particle. $p_{gd}$ represents the previous best solution for the group.

A biologically inspired PSO employs SI. SI is generally the collective behavior of decentralized, self-organized system made up of a population of simple simulation agents interacting locally with one another and with their environment. The simulation agents follow very simple rules. Although there is no centralized control structure dictating how individual simulation agents should behave, local, simple and to a certain degree random interactions between such simulation agents lead to the emergence of "intelligent" global behavior. Natural examples of SI include, but are not limited to, ant colonies, honey bee colonies, honey bee swarms, brains, fish schools, and locust swarms. Accordingly, SI algorithms include, but are not limited to, an Artificial Ant Colony Algorithm ("AACA"), an Artificial Bee Colony Algorithm ("ABCA"), an Artificial Honey Bee Swarm ("AHBS"), an Artificial Brain Algorithms ("ABA'"), an Artificial Fish Swarm Algorithm ("AFSA"), and an Artificial Locust Swarm Algorithm ("ALSA"). AACAs, ABCAs, AHBSs, ABAs, AFSAs and ALSAs are well known in the art, and therefore will not be described in detail herein. Still, a brief discussion of AACAs, ABCAs and AHBSs is provided below for purposes of assisting the reader in understanding the present invention.

The AACA is modeled on the actions of an ant colony. Artificial ants ("simulation agents") locate optimal solutions by moving through a parameter space representing all possible solutions. Natural ants lay down pheromones directing each other to resources while exploring their environment. The artificial ants similarly record their positions and the quality of their solutions, so that in later simulation iterations more artificial ants locate better solutions.

The ABCA is modeled on the foraging behavior of honey bees. The ABCA has three phases: an employed bee phase; an onlooker bee phase; and a scout bee phase. In the employed bee phase and the onlooker bee phase, artificial bees ("simulation agents") exploit sources by local searches in a neighborhood of solutions selected based on deterministic selection in the employed bee phase and the probabilistic selection in the onlooker bee phase. In the scout bee phase, solutions that are not beneficial anymore for search progress are abandoned, and new solutions are inserted instead of them to explore new regions in the search space.

The AHBS is modeled on the swarming behavior of honey bees. When a bee colony becomes too large for a hive, part of the colony splits off and swarms to a new hive location. Prior to the split of the colony using behavior similar to foraging behavior, scout bees identify the best possible location for a new hive. The scout bees return to the original hive. When the colony splits, the scout bees guide the swarming bees to the new hive location. The swarm does not identify the scout bees who know the new location. A small percent of the swarm is the scout bees that know the location. The scout bees do not occupy a lead position, but are randomly distributed in the swarm. The scout bees "steer" the swarm to the location of the new hive because every bee in the swarm follows three simple rules in flight: move in the same direction as your neighbors; remain close to your neighbors; and avoid collisions with your neighbors.

In some scenarios, other types of MOO algorithms are employed in addition to PSO algorithms and/or biologically inspired PSO algorithms for providing the cognitive capabilities of the cognitive network. The other types of MOO algorithms include, but are not limited to: a Normal Boundary Intersection ("NBI") algorithm; a modified NBI algorithm; a Normal Constraint ("NC") algorithm; a successive Pareto optimization algorithm; a Pareto Surface GENeration ("PGEN") algorithm for convex multi-objective instances; an Indirect Optimization on the basis of Self-Organization ("IOSO") algorithm; an S-Metric Selection Evolutionary Multi-Objective Algorithm ("SMS-EMOA"); a Reactive Search Optimization ("RSO") algorithm; and/or a Benson's algorithm for linear vector optimization problems. Each of the listed MOO algorithms is well known in the art, and therefore will not be described herein.

Figure 1:
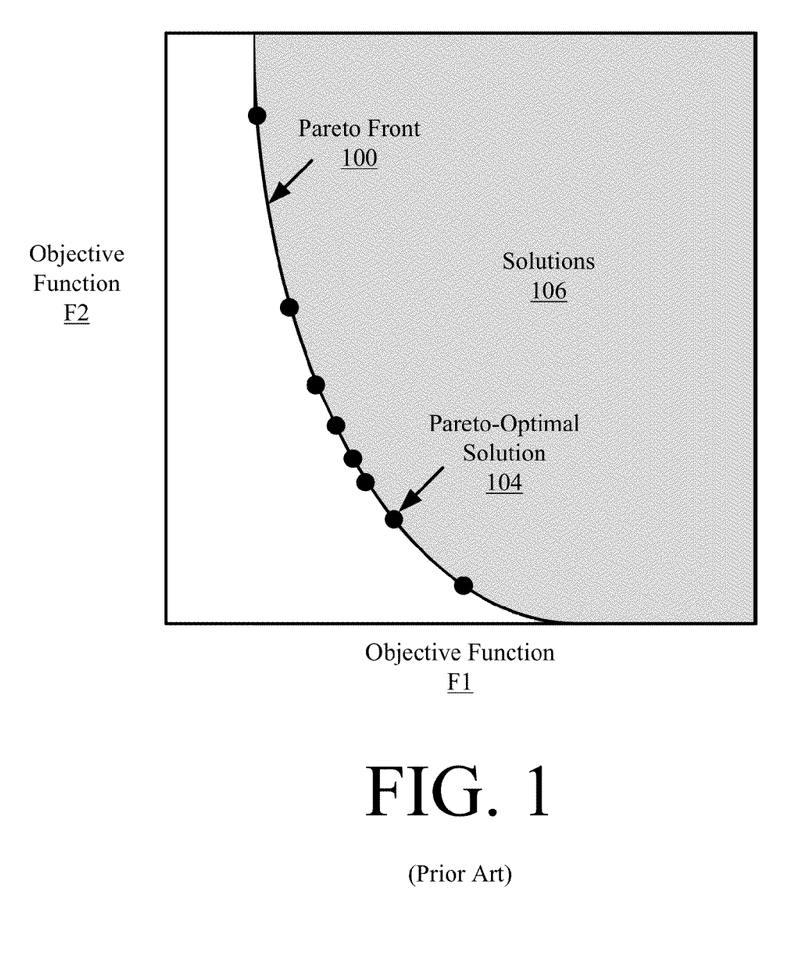
FIG. 1 is a graph illustrating an example of a Pareto front for two objective functions F1 and F2.

Still, it should be understood that every MOO algorithm (including PSOs, MOPSOs and biologically inspired PSOs) yields an N-dimensional Pareto Front of non-inferior solutions, where N is the number of objectives. The non-inferior solutions are solutions where any deviation along any objective axis results in that solution being dominated by a better solution. An example of a Pareto Front 100 for two objective functions F1 and F2 is shown in FIG. 1. As shown in FIG. 1, a set of Pareto-Optimal solutions 104 comprise the Pareto Front 100. Once the Pareto Front is formed, another algorithm can be used to select a best overall solution based on some a priori selected criteria.

Because MOO algorithms and their Pareto Fronts are essential elements of the present invention, a more detailed overview of these concepts is now presented. In many practical optimization based reasoning algorithms with multiple constraints (variables), MOO provides superior results since a single objective with several constraints may not adequately represent the problem. In MOO, instead of a large number of constraints, there is a vector of objectives, $F(x)=[F_1(x), F_2(x), \ldots, F_m(x)]$, that must be traded off in some way.

Let $G_i(x)$ be a constant or bound. MOO's goal is the minimization of the objective vector $F(x)$ subject to those constraints or bounds. That is:

$$\min_{x \in R^n} F(x), \text{ subject to}$$

$$G_i(x) = 0, i = 1, 2, \ldots, k_e; G_i(x) \leq 0, i = k_e + 1, 2, \ldots, k;$$

$$l \leq x \leq u$$

where $k_e$ is the number of equality constraints. $k-k_e$ is the number of inquality contraints. l is the lower bound of x. u is the upper bound of x.

Note that because F(x) is a vector, if any of the components of F(x) are competing, then there is no unique solution to this problem. Instead, the concept of non-inferiority must be used to characterize the objectives. A non-inferior solution is one in which an improvement in one objective requires a degradation of another objective. To define this concept more precisely, consider a feasible region, $\Omega$, in the parameter space. x is an element of the n-dimensional real numbers $x \in R^n$ that satisfies all the constraints, i.e., $$x=\{\Omega \in R^n\}, \text{ subject to}$$

$G_i(x)=0, i=1, 2, \ldots, k_e; G_i(x) \leq 0, i=k_e+1, 2, \ldots, k; l \leq x \leq u$
This allows for the following definition of the corresponding feasible region for the fitness function $\Lambda$.

$$\Lambda = \{y \in R^m : y = F(x), x \in \Omega\}.$$

The performance vector F(x) maps parameter space into fitness function space.

A non-inferior solution point is defined as: Point $x^* \in \Omega$ is a non-inferior solution if for some neighborhood of $x^*$ there does not exist a $\Delta x$ such that $(x^*+\Delta x) \in \Omega$ and $$F_i(x^*+\Delta x) \leq F_i(x^*), i=1,2,\ldots,m \text{ and}$$

$$F_j(x^*+\Delta x) < F_j(x^*) \text{ for at least one } j.$$

Figure 2:
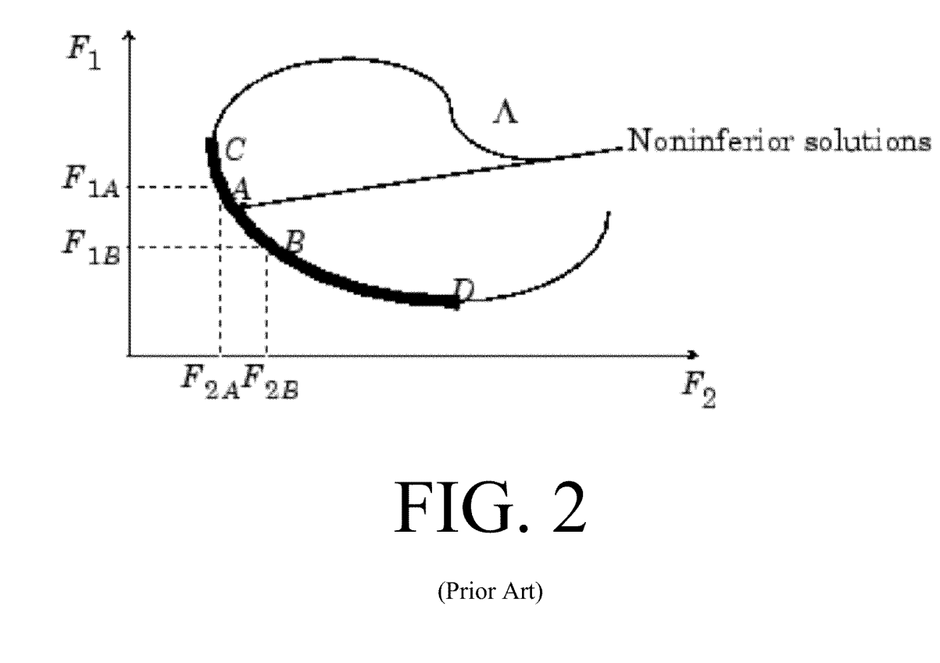
FIG. 2 is an exemplary two-dimensional representation of a figure set of non-inferior solutions.

An exemplary two-dimensional representation of a figure set of non-inferior solutions is provided in FIG. 2. As shown in FIG. 2, the set of non-inferior solutions lies on the curve between point C and point D. Points A and B represent specific non-inferior points. Points A and B are clearly non-inferior solution points because an improvement in one objective $F_1$ requires a degradation in the other objective $F_2$, i.e., $F_{1B} < F_{1A}$, $F_{2B} > F_{2A}$. Since any point in $\Omega$ that is an inferior point represent a point in which improvement can be attained in all the objectives, it is clear that such a point is of no value. MOO is therefore concerned with the generation and selection of non-inferior solution points. Non-inferior solutions are also called Pareto-Optimal solutions. A general goal in MOO is constructing the Pareto-Optimal solutions.

Exemplary Systems Implementing the Present Invention

Exemplary systems of the present invention will now be described in relation to FIGS. 3-5. The following discussion describes an approach to optimize the protocols of the network protocol stack layers for a wireless cognitive network. When the cognitive and other functions required for command and control is distributed, various PSO algorithms are used as the basis of command and control communication. The PSO algorithms can be thought of as not only supplying some of the required machine intelligence, but also acting in an information compression roll for inter-processor or inter-node messages.

Figure 3:
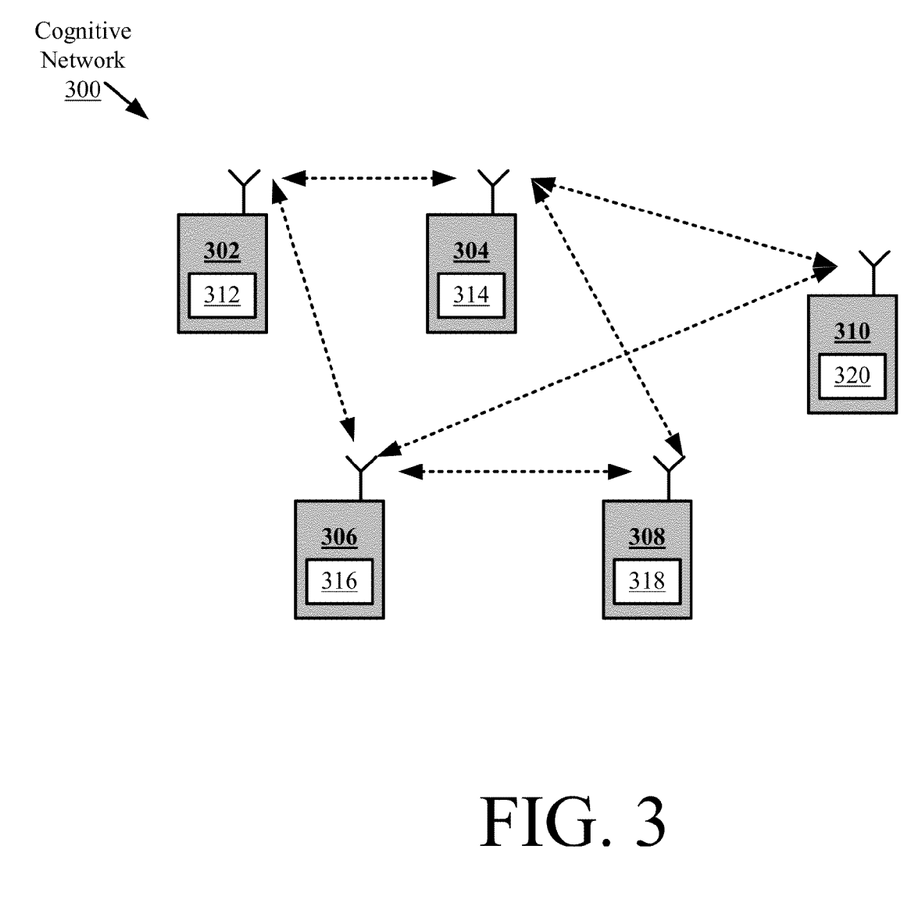
FIG. 3 is a schematic illustration of an exemplary distributed multi-layer PSO based cognitive network.

Referring now to FIG. 3, there is provided a schematic illustration of an exemplary cognitive network 300 that is useful for understanding the present invention. Although the cognitive network 300 is shown as generally having a radio system network architecture, the present invention is not limited in this regard. The cognitive network 300 can alternatively comprise a different network architecture defined by base stations, base station controllers, and/or various types of communication devices. In the radio system network architecture scenario, the cognitive network 300 comprises a plurality of portable radios 302-310. The portable radios 302-310 can include, but are not limited to, Software Defined Radios ("SDRs") with spectral sensing capabilities. SDRs are well known in the art, and therefore will not be described in detail herein.

Cognitive network 300 is multiple-parameter optimized so that its overall project or mission metrics are met, and not just one parameter that is either specific to a protocol stack layer or shared by only two protocol stack layers. PSO is employed by cognitive network 300 for achieving the multiple-parameter optimization. In this regard, it should be understood that different PSO models can be used, each with properties aligned with the characteristics of a particular protocol stack layer, to form the basis of a distributed cross-layer cognitive engine. For example, a distributed biologically inspired PSO technique employing an AHBS is used for optimizing operations of a physical layer of an OSI protocol stack because of its messaging characteristics. A distributed biologically inspired PSO technique employing an AACA is used for optimizing operations of a data link layer of the OSI protocol stack because of its pheromone inspired finite fading memory and reinforcement property. The present invention is not limited to the particularities of this example. Other examples can be provided in which distributed biologically inspired and/or non-biologically inspired PSOs are used in protocol stack layers to minimize non-payload inter-processor or inter-node communication as shown in FIG. 3 and which match the requirements thereof.

Notably, the PSO models and distributed intelligence algorithm parameters employed by cognitive network 300 can be dynamically adjusted during operations thereof. This dynamic adjustment can be made in accordance with changes in network requirements and network conditions. For example, the PSO models and distributed intelligence algorithm parameters may be dynamically changed based on changes in latency requirements, bandwidth requirements, and/or other communication requirements. The PSO models and distributed intelligence algorithm parameters may additionally or alternatively be dynamically changed based on changes in data bursts, network latency, network load, network download speed, network upload speed, and/or available bandwidth.

Biologically inspired PSOs generally display many properties that are consistent with the cognitive requirements of networks that are required to coordinate themselves via RF communication to meet changing project, mission, radio environment, and policy conditions. The "particles" in biologically inspired PSOs are computation agents which communicate locally via simple messaging which collectively form an intelligent entity ("the swarm"). In the cognitive network 300 context, the computation agents comprise processing devices 312-320 contained in the network nodes 302-310. The processing devices 312-320 form a distributed processor which is instantiated in all of the network nodes 302-310. The distributed processor 312-320 includes hardware (i.e., electronic circuits) and/or software configured to perform the basic concepts described below in relation to FIG. 4 and methods described below in relation to FIG. 6.

A function of the distributed processor 312-320 is to compress information that must be shared by all network nodes 302-310 to keep the network operation near optimal with a minimum of overhead in ever changing requirements and conditions. The network nodes 302-310 can include, but are not limited to, cognitive radios. The cognitive radios in the network nodes 302-310 form the physical layer of the cognitive network 300. The network nodes 302-310 will be described in detail below in relation to FIG. 5.

Notably, as a consequence of using biologically inspired PSOs, the computational loading can be dynamically partitioned across all active processing elements in a network node or across all active network nodes 302-310 based on the number of processing elements in a node, the processing capacity of each processing element, the number of network nodes, node information density, and system level computational requirements. This is beneficial when the computational capability of the cognitive network 300 grows asymptotically and when the computational capacity of the cognitive network 300 exceeds the asymptotic limit of the computational requirement but that of a single node does not. In the case of computational load sharing across network nodes, computational load of each network node 302-310 can be scaled back as more nodes join the network 300, thus reducing the power draw of each network node 302-310 to extend the life of the power source and likely decrease its heat and electromagnetic radiation signature.

Figure 4:
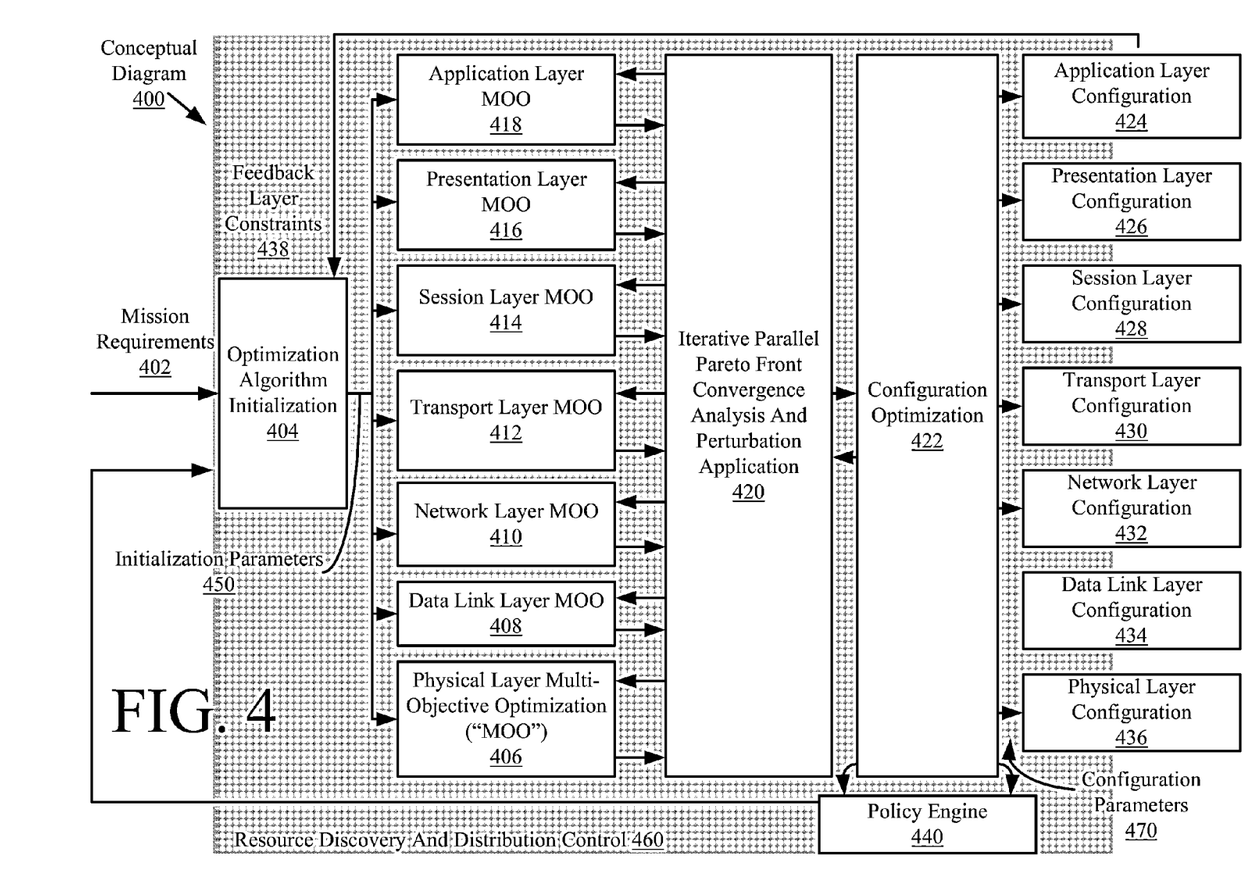
FIG. 4 is a diagram that is useful for understanding basic concepts employed by the cognitive network of FIG. 3.

Referring now to FIG. 4, there is provided a conceptual diagram 400 that is useful for understanding operations performed by a cognitive network node in the cognitive network 300 or the cognitive network 300. As noted above, cognitive network 300 generally employs a distributed intelligence algorithm for optimizing its overall performance. The distributed intelligence algorithm is implemented by the distributed processor 312-320 which is instantiated in the network nodes 302-310 of the cognitive network 300. Accordingly, the functions of functional blocks 404-440 of conceptual diagram 400 are achieved by performing corresponding operations in a single processor, in multiple co-located processors or at the distributed processor 312-320 of the network nodes 302-310.

As shown in FIG. 4, new or updated project or mission requirements 402 are received at a single processor, by multiple co-located processors or by the distributed processor 312-320 of cognitive network 300. The project or mission requirements 402 may be in a standard ontology. The standard ontology represents project or mission requirements as a set of concepts within a domain, and the relationships among these concepts. As such, in some scenarios, the ontology includes a plurality of terms and an index. The index defines a plurality of relationships between the terms and project/mission requirements 402. A project or mission requirement is identified based on at least one term and the index.

After receiving the project or mission requirements 402, operations for optimization algorithm initialization are performed in functional block 404. Such operations include using at least one AI algorithm and/or at least one Table Look Up ("TLU") method to compute initialization parameters 450 for a plurality of optimization algorithms which collectively are to be used to optimize performance of the cognitive network 300. In some scenarios, the AI algorithm includes, but is not limited to, a symbolic AI algorithm, a sub-symbolic AI algorithm, or a statistical AI algorithm. Each of the listed types of AI algorithms is well known in the art, and therefore will not be described herein.

Also, the type of AI algorithm(s) and/or initialization parameter(s) can be selected in accordance with a particular "use case". The term "use case", as used herein, refers to a methodology used in system analysis to identify, clarify, and organize system requirements. A "use case" is made up of a set of possible sequences of interactions between system components (e.g., network nodes) and users in a particular environment and related to a particular goal. A "use case" can have the following characteristics: organizes functional requirements; models the goals of system/user interactions; records paths from trigger events to goals; describes one main flow of events and/or exceptional flow of events; and/or is multi-level such that another "use case" can use the functionalities thereof.

The functions of block 404 are achieved using feedback layer constraints 438 derived from successful project or mission executions. Block 404 uses the successful project/mission feedback layer constraints to "learn" and to later use said successful project/mission feedback layer constraints to generate initialization parameters in future similar use cases. The "learning" mechanisms for the aforementioned algorithms are well known in the art, and therefore will not be described in detail herein. These inputs are then used to determine a previously seen similar set of circumstances and the corresponding end result. The end results are then used for initialization. The feedback layer constraints 438 include information concerning the status and constraints that apply to protocol stack layer resources of at least one network node. For example, a peak in computational load required for a receive side physical layer to overcome a severe channel distortion may limit the capabilities of a transmit side application layer to concurrently apply a computationally intense algorithm. In this scenario, the functions of block 404 may have to initialize certain optimization algorithms toward solutions requiring moderate computational loading in other protocol stack layers.

The functions of block 404 are also achieved using network-related information concerning the resources that are available on each network node 302-310. The functions for maintaining an updated knowledge base of such network-related information are performed in functional block 460. In some scenarios, the network-related information includes, but is not limited to, a free computational capacity of each network node, a reserve power of each network node, and/or a spectral environment of each network node. Also, the network-related information may be updated on a pre-defined periodic basis.

In some scenarios, the operations of functional block 404 are performed in a distributed fashion in which all network nodes assist in computing the initialization parameters 450. However, in other scenarios, the initialization parameters 450 are computed by a single network node, and then distributed to the remaining network nodes. Still, in yet other scenarios, the initialization parameters 450 are computed using only a select few of the network nodes, and then distributed to the remaining network nodes. In the last scenarios, geographically close network nodes are grouped so as to define a sub-cognitive network. One of the network nodes of the sub-cognitive network is selected to compute the initialization parameters for itself and the other network nodes of the sub-cognitive network. Such a sub-cognitive network configuration is power and security efficient.

Once the initialization parameters 450 have been computed, they are distributed to functional blocks 406-418, respectively. In functional blocks 406-418, the initialization parameters 450 and/or the network-related information are used for determining a plurality of possible outcomes that are Pareto efficient when different values for protocol stack layer parameters are employed. In this regard, a Pareto Front for at least one distributed MOO algorithm can be determined in each functional block 406-418. Pareto Fronts are well known in the art, and briefly described above.

In some scenarios, a Pareto Front for at least one MOO algorithm is determined in each functional block 406-410 which may result in protocol optimization of a physical layer, a data link layer, or a network layer. In this regard, the MOO algorithms employed in functional blocks 406-410 can include distributed biologically inspired PSO algorithms. The present invention is not limited in this regard. Functional blocks 406-410 can additionally or alternatively employ other types of MOO algorithms. Similarly, a Pareto Front for at least one MOO algorithm is determined in each functional block 412-418 which may result in protocol optimization of a transport layer, a session layer, a presentation layer, or an application layer. In some scenario, the MOO algorithms employed in functional blocks 412-418 include MOO algorithms other than PSO algorithms. The present invention is not limited in this regard. Functional blocks 412-418 can additionally or alternatively employ PSO algorithms, and more particularly distributed biologically inspired PSO algorithms.

The number and types of MOO algorithms employed for each protocol stack layer can be selected in accordance with a particular "use case". The same or different type of MOO algorithm can be used for optimizing protocols of each of the protocol stack layers. For example, a first biologically inspired PSO (e.g., a distributed AHBS) can be used for optimizing protocols of a data link layer and/or a physical layer of an OSI protocol stack. A second different biologically inspired PSO (e.g., a distributed AACA) can be used for optimizing protocols of a network layer of the OSI protocol stack. A first MOO (e.g., an SMS-EMOA algorithm) and/or a third PSO can be used for optimizing protocols of a transport layer of the OSI protocol stack. A second different MOO and/or a fourth PSO can be used for optimizing protocols of a session layer, presentation layer, and/or application layer of the OSI protocol stack. The third and fourth PSOs can be the same as or different than the first biologically inspired PSO or second biologically inspired PSO. The present invention is not limited in this regard.

Notably, the MOO algorithm(s) used in each functional block 406-418 may be unique thereto and/or customized to the requirements of a respective protocol stack layer. Also, the MOO algorithm(s) for each protocol stack layer can be part of a larger distributed intelligence algorithm implemented by the plurality of network nodes 302-310. In this regard, inter-node communications may or may not be required for facilitating functions of blocks 406-418. If inter-node communications are required for facilitating functions of a block 406-418, then the inter-node communications may or may not be part of the larger distributed intelligence algorithm. In the case of each protocol stack layer being part of a larger distributed intelligence algorithm implemented by the plurality of network nodes 302-310, at least one distributed PSO is employed in a functional block 406-418 as the distributed MOO algorithm when the inter-node communications therefore comprise part of the larger distributed intelligence algorithm.

After a plurality of solutions (e.g., solutions 106 of FIG. 1) have been calculated for all of the protocol stack layers by partially solving the MOO algorithms, operations are performed in functional block 420 to monitor the convergence behaviors of the MOO algorithms to identify when the solutions thereof start to converge toward Pareto-Optimal solutions (e.g., Pareto-Optimal solutions 104 of FIG. 1). The term "convergence", as used herein, refers to the process of approaching some limiting value. Methods for monitoring the convergence behavior of MOO algorithms are well known in the art, and therefore will not be described herein. Any known or to be known method for monitoring the convergence behavior of MOO algorithms can be used herein without limitation.

Operations are also performed by functional block 420 to "guide" or "bias" the convergence of the solution trajectories based on a hierarchical prioritization of the protocol stack layers to make sure that compatible non-dominated solutions are generated at each protocol stack layer. The term "compatible non-dominated solutions", as used herein, refers to solutions that are not dominated by a better solution derived for a particular protocol stack layer and that are compatible with solutions generated for other protocol stack layers given a particular set of project/mission requirements. For example, if a use case dictates a high resolution real time video between some identified nodes, as the application layer converged to a set of possible encodings, functional block 420 would "bias" the other protocol stack layers to those that support the required transfer rates of some of the encoding methods while perhaps taking into consideration overall system power consumption.

Accordingly, functional block 420 iteratively generates and provides feed back information to at least one functional block 406-418 which causes problem constraints and/or populations of candidate solutions ("particles") thereof to be modified. Notably, the problem constraints and/or populations of candidate solutions may or may not be changed for all MOO algorithms during any given iteration. For example, during a first iteration, the problem constraints are only modified for the MOO algorithm employed by the data link layer and the transport layer. In contrast, the problem constraints for all protocol stack layers are modified during a second iteration.

The feed back information can be generated using at least one AI algorithm that is independent of the MOO algorithms employed in functional blocks 406-418. The feed back information can include, but is not limited to, information specifying values within which at least one objective is to be restricted during a next iteration of a respective MOO algorithm. The modification of constraints and/or populations of candidate solutions ("particles") causes the solution trajectory of a respective MOO algorithm to be "guided" or "biased" to solutions that all support a "good" or near optimal system overall network solution. The "guiding" or "biasing" is performed based on the hierarchical prioritization of the protocol stack layers that drive a solution given a project/mission requirement set.

Notably, solutions for all of the MOO algorithms are computed in each search iteration thereof. As such, the MOO algorithms having modified problem constraints and/or populations of candidate solutions ("particles") will have their solution trajectories changed, while the solutions of the MOO algorithms that do not have modified problem constraints and/or populations of candidate solutions ("particles") will continue to converge on the same trajectories. Such an iterative process performed by functional blocks 406-420 enables generation of a single system level Pareto Front providing near optimal system solutions without the prohibitive complexity of a single high dimensional/single algorithm multi-objective optimizer.

At some point during the iterative process, functional block 420 will determine that the solution trajectories of the MOO algorithms are all in an acceptable general direction. By solution trajectories in accepted general solutions, it is meant that solution trajectories are observed to be converging to solution regions that exclude solution populations with unacceptable solutions under the modified constraints. Extending a previously given example, if a use case dictates a high resolution real time video link between some identified nodes, as the application layer converged to a set of possible encodings, functional block 420 would observe the computational loads required by the encoding algorithms that meet the real-time and resolution requirements of the mission. Functional block 420 would then re-allocate computational load budgets for other protocol stack layers and also recalculate minimum data throughput rates that the protocol stack layers must support. It would then appropriately modify constraints on appropriate stack layers MOO algorithms to "bias" the other protocol stack layers to those solution regions that support the required solutions. Functional block 420 would then monitor the convergences until such time that it verifies that the iterative solution trajectories are only in the direction of solution regions that exclusively contain solutions in the newly refined solution space constraints.

In response to such a determination, the functional block 420 ceases modification of problem constraints and/or populations of the MOO algorithms so that the MOO algorithms can converge to compatible non-dominated solutions. Under this assumption, each MOO algorithm will declare convergence under whatever convergence criteria has been selected. The criteria is either fixed based on a use case and algorithm type, or determined by functional block 420 based on some observables. The observables can be obtained from information received from block 422.

Once the solutions of the MOO algorithms converge to compatible non-dominated solutions, additional computations are performed in functional block 420 to develop the best overall network solutions. The term "best overall network solution", as used herein, refers to an optimal solution for overall protocol stack configuration given at least the current network architecture, current network environment, current network conditions, current project/mission requirements, and current project/mission objectives. The "best overall network solutions" are developed using the Pareto Fronts generated in functional blocks 406-418.

The functions of functional block 420 may be implemented in a distributed fashion in which a plurality of network nodes perform some of the "additional computations" or a centralized fashion in which a single network node performs all of the "additional computations". The "additional computations" involve: applying another set of algorithms to the entire solution spaces including the Pareto Fronts; developing the best overall network solutions based on the solutions for the algorithms; and ranking the best overall network solutions according to a set of criteria appropriate to a specific application space and conditions in which the cognitive network is operating.

The set of algorithms used in functional block 420 can include, but are not limited to, Case-Based Reasoning ("CBR") algorithms, expert system algorithms, and neural network algorithms. Such algorithms are well known in the art, and therefore will not be described in detail herein. Still, it should be understood that inputs to functional block 420 may include, but are not limited to, project-related inputs, mission-related inputs, network topology inputs, and/or RF environment inputs. These inputs are then used to determine a previously seen similar set of circumstances and the corresponding end result. The end results are then used for initialization of configuration optimization. If a CBR algorithm or a neural network algorithm is used in functional block 420, then the end results may be fed back for use in a next iteration of said algorithm. In contrast, if expert system algorithms are employed in functional block 420, then the end results may not be fed back.

The ranked "best overall network solutions" are then analyzed in functional block 422 to: identify which solutions are compliant with current regulatory policies and/or project/mission policies; and identify a top ranked solution from the identified solutions. If no ranked "best overall network solutions" are policy compliant, then a policy engine 440 attempts to "suggest" possible approaches that would bring the cognitive network system 300 into compliance. The "suggested" possible approaches are then supplied to functional block 422 first. In response, a second iteration of the functions of block 422 are performed for use thereby to generate policy compliant solutions. If functional block 422 cannot generate a compliant solution, then the "suggested" possible approaches are then supplied to functional block 404 for use thereby. In response, a second iteration of the functions of blocks 404-422 are performed to generate policy compliant solutions.

If at least one of the ranked "best overall network solutions" is policy compliant, then a "favored solution" is selected in functional block 422. Configuration parameters 470 are then computed for the protocols of the protocol stack layers that enable an implementation of the "favored solution" within the cognitive network 300. Subsequently, the network resources of the protocol stack layers are configured in accordance with the respective configuration parameters 470, as shown by functional blocks 424-436. The network resources remain in their current configuration until the project changes, mission changes, the network topology changes and/or the network's operating environment changes.

Going back to the analogy of the multi-department organization, the basic concept applied by the present invention is akin to each department being told to come back with a report explaining nearly completely a plan to optimize that department. The Chief Executive Officer ("CEO") then digests each report and develops suggestions for how each department must operate to be as effective as it can while supporting the overall goal of optimizing the performance of the entire organization. The CEO will then review the revised reports, determine how close they come to the overall goal and keep doing that until s/he is satisfied that when implemented, the operation of each department, aggregated, will optimize the performance of the entire organization. The acts performed by the CEO are akin to the functions performed in block 420.

Figure 5:
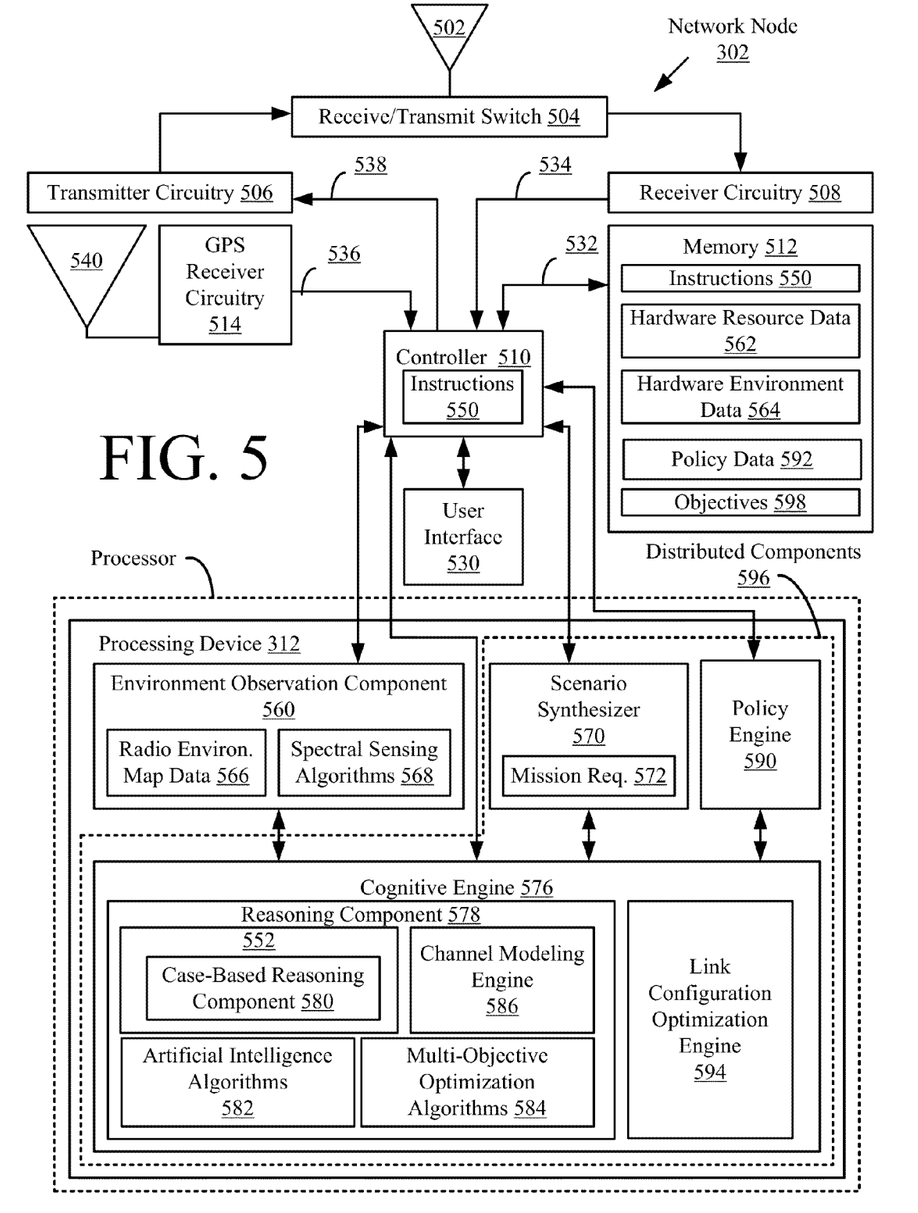
FIG. 5 is a detailed block diagram of an exemplary network node.

Referring now to FIG. 5, there is provided a detailed bock diagram of an exemplary network node 302 that is useful for understanding the present invention. The network nodes 304-310 of FIG. 3 can be the same as or similar to network node 302. As such, the discussion of network node 302 is sufficient for understanding network nodes 304-310. As should be understood, the network nodes 302-310 form the physical layer of the cognitive network 300 as well as the host platform for some or all of the other protocol stack layers.

Network node 302 can include more or less components than those shown in FIG. 5. However, the architecture of network node 302 shown in FIG. 5 is sufficient for facilitating optimization of operations of cognitive network 300 as described above. In this regard, network node 302 implements at least a portion of a method for providing a parallel multi-layer MOO based cognitive network. Exemplary embodiments of said method will be described below in relation to FIG. 6.

In some scenarios, network node 302 comprises an SDR with a spectral sensing capability. SDRs are well known in the art, and therefore will not be described in detail herein. Still, it should be understood that the network node 302 is software configured in RF characteristics and software programmable in protocol stack layers.

As shown in FIG. 5, the network node 302 comprises an antenna 502 for receiving and transmitting RF signals. A receive/transmit (Rx/Tx) switch 504 selectively couples the antenna 502 to the transmitter circuitry 506 and receiver circuitry 508 in a manner familiar to those skilled in the art. The receiver circuitry 508 demodulates and decodes the RF signals received from another network node (e.g., the network node 304 of FIG. 3) to derive information therefrom. The receiver circuitry 508 is coupled to a controller 510 via an electrical connection 534. The receiver circuitry 508 provides the decoded RF signal information to the controller 510. The controller 510 uses the decoded RF signal information in accordance with the function(s) of the network node 302. The controller 510 also provides information to the transmitter circuitry 506 for encoding and modulating information into RF signals. Accordingly, the controller 510 is coupled to the transmitter circuitry 506 via an electrical connection 538. The transmitter circuitry 506 communicates the RF signals to the antenna 502 for transmission to an external device (e.g., network node 304 of FIG. 3).

An optional antenna 540 is coupled to an optional Global Positioning System ("GPS") receiver circuitry 514 for receiving GPS signals. The GPS receiver circuitry 514 demodulates and decodes the GPS signals to extract GPS location information therefrom. The GPS location information indicates the location of the network node 302. The GPS receiver circuitry 514 provides the decoded GPS location information to the controller 510. As such, the GPS receiver circuitry 514 is coupled to the controller 510 via an electrical connection 536. The controller 510 uses the decoded GPS location information in accordance with the function(s) of the network node 302.

The controller 510 stores the decoded RF signal information and the decoded GPS location information in a memory 512 of the network node 302. Accordingly, the memory 512 is connected to and accessible by the controller 510 through an electrical connection 532. The memory 512 can be a volatile memory and/or a non-volatile memory. For example, the memory 512 can include, but is not limited to, a Random Access Memory ("RAM"), a Dynamic Random Access Memory ("DRAM"), a Static Random Access Memory ("SRAM"), a Read-Only Memory ("ROM"), a disk drive, a flash memory, and/or any combination thereof. The memory 512 can also have stored therein hardware resource data 562, hardware environment data 564, policy data 592, and instructions 550. The hardware resource data 562 includes, but is not limited to, data specifying at least one capability of the network node 302. The hardware environment data 564 includes, but is not limited to, data characterizing a network node environment. The policy data 592 includes, but is not limited to, data specifying current regulatory and project/mission policies.

The instructions 550 can also reside, completely or at least partially, within the controller 510 during execution thereof by the network node 302. In this regard, the memory 512 and the controller 510 can constitute machine-readable media. The term "machine-readable media", as used here, refers to a single medium or multiple media that store the one or more sets of instructions 550. The term "machine-readable media", as used here, also refers to any medium that is capable of storing, encoding or carrying the set of instructions 550 for execution by the network node 302 and that cause the network node 302 to perform one or more of the methodologies of the present disclosure.

The controller 510 is also connected to a user interface 530. The user interface 530 is comprised of input devices (not shown), output devices (not shown), and software routines (not shown) configured to allow a user to interact with and control software applications (not shown) installed on the network node 302. Such input and output devices can respectively include, but are not limited to, a display, a speaker, a keypad, a directional pad, a directional knob, a microphone, and a PTT button. Each of the listed input and output devices is well known in the art, and therefore will not be described herein.

As shown in FIG. 5, the network node 302 further comprises a processing device 312. The processing device 312 comprises an Environmental Observation Component ("EOC") 560 and elements of various components 596 of the processor. Such elements include a scenario synthesizer 570, a cognitive engine 576, and a policy engine 590. The processing device 312 may be part of a distributed processor 312-320. In this case, the processors 312-320 act as a distributed processor that employs a distributed intelligence algorithm for facilitating the optimization of the overall performance of the cognitive network 300. In such cases, the distributed processor 312-320 includes hardware (e.g., electronic circuits) and/or software configured to perform the operations described above in relation to FIG. 4 and the method described below in relation to FIG. 6 in a distributed fashion. In this regard, the processing device 312 comprises an Environment Observation Component ("EOC") 560 and elements of various distributed components 596 of the distributed processor. Such elements include a scenario synthesizer 570 of a distributed scenario synthesizer (not shown), a cognitive engine 576 of a distributed cognitive engine (not shown), and a policy engine 590 of a distributed policy engine (not shown).

As described above, initialization parameters 402 for the intelligence algorithm are computed during operation of the cognitive network 300. In scenarios in which some or all of the initialization parameters are computed by network node 312, cognitive engine 576 of network node 312 includes an optional Initialization Parameter Generator ("IPG") 552. IPG 552 is configured to use project/mission requirements 402, feedback layer constraints 438 and/or network-related information for computing the initialization parameters for the MOO algorithms 584 employed by itself and/or other network nodes 304-310. The initialization parameters can be computed using at least one AI algorithm 582 and/or TLU method. The type of AI algorithm 582 or initialization parameters can be selected in accordance with a particular "use case", as described above. If the IPG 552 computes initialization parameters for other network nodes, then network node 312 communicates the initialization parameters to those other network nodes, respectively. The initialization parameters can be communicated via command and control communication. After the initialization parameters have been computed, the processing device 312 uses the respective initialization parameters and/or network-related information to facilitate the optimization of overall network performance.

In some scenarios, the initialization parameters are computed using CBR and/or fuzzy algebra. CBR and fuzzy algebra are well known in the art, and therefore will not be described in detail herein. However, a brief discussion of the operations performed by the network node 302 for computing the initialization parameters is provided below to assist a reader in understanding CBR scenarios.

In the CBR scenarios, the IPG 552 includes a CBR component 580 that is generally configured to receive case-related information from EOC 560 and process the same. In this regard, the EOC 560 performs operations to generate a Full Characterization of the Network Node Environment ("FCNNE"). FCNNE is generated by combining data 562, 564 with Radio Environment Map ("REM") data 566. The REM data 566 characterizes a static local network node environment (e.g., hidden nodes, terrain, etc.) and distant network node environments. The REM data 566 is updatable via command and control communication. FCNNE is then communicated from the EOC 560 to the scenario synthesizer 570.

At the scenario synthesizer 570, FCNNE is combined with the current project or mission requirements 572 so as to synthesize a set of objectives 598, limits, and boundary conditions for the cognitive engine 576. The objectives 598 may be stored in memory 512 in a particular format (e.g., a table format). Thereafter, the objectives 598 are combined with the radio hardware environment data 564 to generate combined objective/environment data. The combined objective/environment data is used by the scenario synthesizer 570 to generate at least one case identifier. The case identifier(s) is(are) then communicated to the CBR component 578 of the cognitive engine 576. The CBR component 578 uses the case identifier(s) to: select the number of MOO algorithms that should be employed for each protocol stack layer; select the type of MOO algorithm(s) to be employed for each protocol stack layer; and/or determine the initialization parameters for the MOO algorithms 584.

Once the initialization parameters have been determined, they are used by the cognitive engine 576 to facilitate optimization of protocol stack performance. In this regard, a Pareto Front for each selected MOO algorithm 584 is determined. Notably, the MOO algorithms 584 comprise at least one MOO algorithm for each protocol stack layer that is unique thereto and/or customized to the requirements thereof. The same or different MOO algorithm can be used for two or more of the protocol stack layers. In some scenarios, an SPO algorithm (more particularly, a biologically inspired PSO algorithm) is employed for at least one of the protocol stack layers (e.g., a physical layer, a data link layer, and/or a network layer). Each of the MOO algorithms (including PSOs and biologically inspired PSOs) yields an N-dimensional Pareto Front of non-inferior solutions, as described above.

As noted above, the MOO algorithms can be part of a larger distributed intelligence algorithm implemented by network node 302 and other network nodes 304-310 of the cognitive network 300. In this regard, inter-node communications may be required for computing the Pareto Fronts. Accordingly, in some scenarios, network node 302 communicates with other network nodes 304-310 using command and control communications for purposes of deriving a solution to one or more MOO algorithms 584.

While the cognitive engine 576 generates a plurality of first solutions (e.g., solutions 106 of FIG. 1) for each protocol stack layer, it monitors the convergence behavior of the MOO algorithms 584 to identify when the solutions thereof start to converge toward Pareto-Optimal solutions (e.g., Pareto-Optimal solutions 104 of FIG. 1). Methods for monitoring the convergence behavior of MOO algorithms 584 are well known in the art, and therefore will not be described here. Any known or to be known method for monitoring the convergence behavior of an MOO algorithm 584 can be used here without limitation.

Once the cognitive engine 576 determines that the solutions of the MOO algorithms are starting to converge toward Pareto-Optimal solutions, it begins to "guide" or "bias" the convergence of the solution trajectories so as to ensure that compatible non-dominated solutions will be generated at each protocol stack layer. The "guiding" or "biasing" can be based on a hierarchical prioritization of the protocol stack layers. The "guiding" or "biasing" is achieved by iteratively modifying or adjusting the problem constraints and/or populations of candidate solutions ("particles") of the MOO algorithms 584. Notably, the problem constraints and/or populations of candidate solutions may or may not be changed for all MOO algorithms during any given iteration of searching performed by the MOO algorithms.

At some point in the iterative process, the cognitive engine 576 will determine that the solution trajectories of the MOO algorithms are all in an acceptable general direction. In response to such a determination, the cognitive engine 576 ceases modification of problem constraints and/or populations of candidate solutions ("particles") of the MOO algorithms 584 so that the MOO algorithms can converge to compatible non-dominated solutions. Thereafter, the cognitive engine 576 communicates the Pareto Fronts to the policy engine 590.

At the policy engine 590, additional operations are performed to facilitate the development of the best overall network solutions. The additional operations involve: applying additional algorithms at least to the Pareto Fronts generated by cognitive engine 576; assisting in the development of the best overall network solutions based on the solutions to the additional algorithms; and assisting in the ranking of the best overall network solutions according to a set of criteria appropriate to a specific application space and conditions in which the cognitive network 300 is operating. The additional algorithms can include, but are not limited to, CBR algorithms, expert system algorithms, and/or neural network algorithms.

Subsequently, the policy engine 590 assists in the analysis of the ranked best overall network solutions to: identify which solutions are compliant with current regulatory policies and/or project/mission policies; and identify a top ranked solution from the identified solutions. Policy compliance can be determined using the boundary conditions generated by scenario synthesizer 570. If no ranked best overall solutions are policy compliant, then the policy engine 590 assists in a determination of possible approaches that would bring the cognitive network 300 into compliance. The possible approaches are feedback to the CBR component 580 to give direction regarding how the solution can be brought into compliance. There is no fixed process for how the CBR component 580 uses the fed back information.

If at least one ranked best overall solutions is policy compliant, then it is passed to a Link Configuration Optimization ("LCO") engine 594. The LCO engine 594 uses a radio resource cost function to down select to a single configuration solution. The solution is evaluated to assess quality.

Exemplary Methods Implementing the Present Invention

Figure 6:
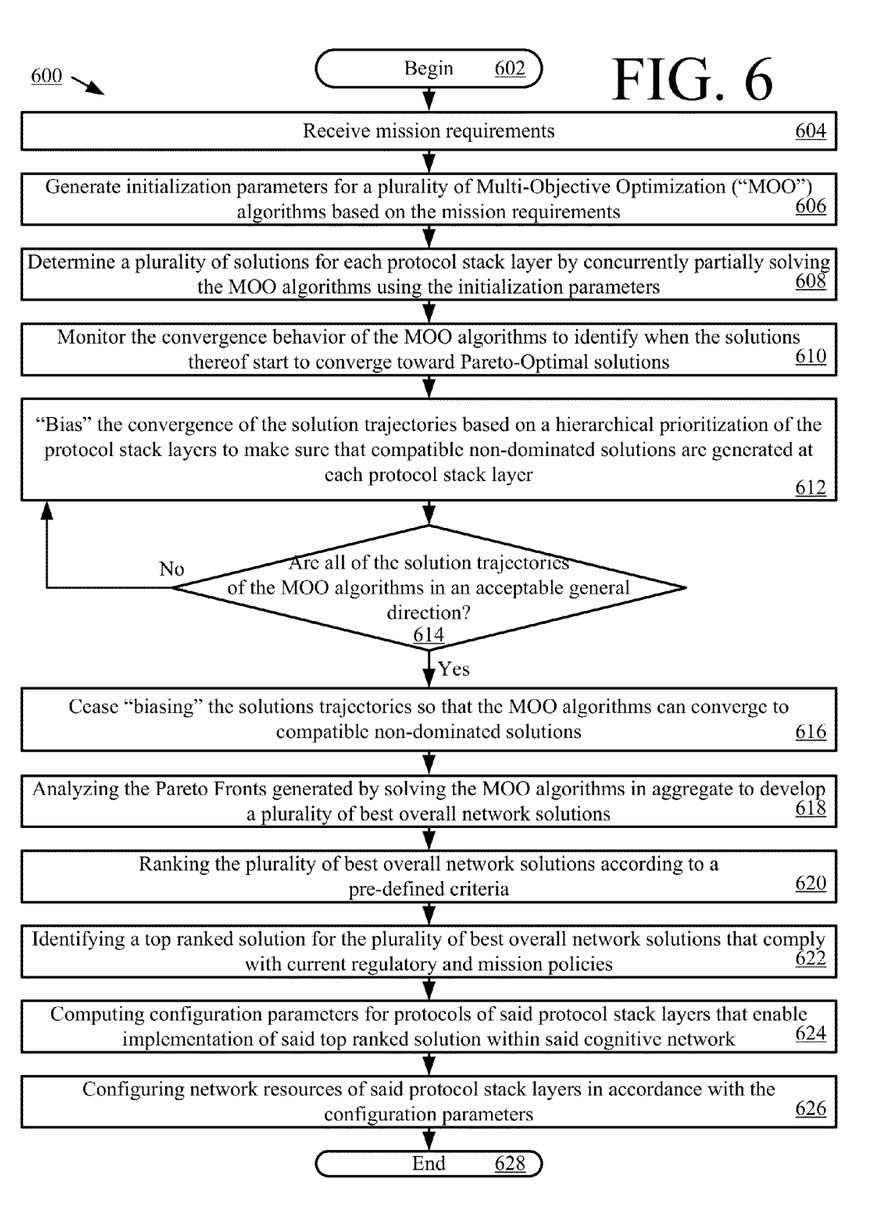
FIG. 6 is a flow diagram of an exemplary method for providing a cognitive network.

Referring now to FIG. 6, there is provided a flow diagram of an exemplary method for providing a cognitive network (e.g., cognitive network 300 of FIG. 3) that is useful for understanding the present invention. As shown in FIG. 6, method 600 begins with step 602 and continues with step 604. In step 604, policy/mission requirements (e.g., policy or mission requirements 402 of FIG. 4) are received. The policy/mission requirements are then used in step 606 to generate initialization parameters for a plurality of MOO algorithms.

The initialization parameters can be generated using at least one AI algorithm and/or TLU method. The AI algorithm can include, but is not limited to, a CBR algorithm and/or a fuzzy algebra algorithm. The type of algorithm used in step 606 may be selected in accordance with a use case. The use case can be made up of a set of possible sequences of interactions between network components and users in a particular environment. In this regard, the initialization parameters may be generated using: information specifying a status and constraints that apply to protocol stack layer resources of at least one network node; and/or information concerning resources that are available on each network node of the cognitive network.

In some scenarios, step 606 is performed in a distributed fashion in which all network nodes of the cognitive network assist in generating the initialization parameters. In other scenarios, step 606 is performed in a centralized fashion in which a single network node generates the initialization parameters. In yet other scenarios, step 606 is performed in a semi-distributed fashion in which only a select few of the network nodes assist in the generation of the initialization parameters.

Once the initialization parameters have been generated, they are used to determine a plurality of first Pareto Front solutions for each protocol stack layer of a protocol stack, as shown by step 608. The Pareto Front solutions are determined by concurrently solving the MOO algorithms. At least one of the MOO algorithms comprises a biologically inspired PSO algorithm. In some scenarios, the biologically inspired PSO algorithm is used for a physical layer, a data link layer, and/or a network layer of a protocol stack. Also, a different type of MOO algorithm may be employed for at least two of the protocol stack layers. In cases implementing inter-processor or inter-node distributed MOO algorithms, the type of distributed MOO algorithm to be employed for at least one protocol stack layer can be selected based on an amount of non-payload inter-node communication and requirements of the protocol stack layer. Similarly in said cases, the number of distributed MOO algorithms to be employed for at least one protocol stack layer is selected based on an amount of non-payload inter-node communication and requirements of the protocol stack layer.

In a next step 610, the convergence behavior of the MOO algorithms is monitored to identify when the solutions (e.g., solutions 106 of FIG. 1) start to converge toward Pareto-Optimal solutions (e.g., Pareto-Optimal solutions 104 of FIG. 1). Methods for monitoring the convergence behavior of MOO algorithms are known in the art, and therefore will not be described herein. Any known or to be known method for monitoring the convergence behavior of MOO algorithms can be used herein without limitation.

When such an identification occurs, the method 600 continues with step 612. Step 612 involves "guiding" or "biasing" the convergence of the solution trajectories based on a hierarchical prioritization of the protocol stack layers to make sure that the compatible non-dominated solutions are generated at each protocol stack layer. The "guiding" or "biasing" is achieved by modifying or adjusting the problem constraints and/or populations of candidate solutions ("particles") of one or more MOO algorithm. An AI algorithm, independent from the MOO algorithms, can be used to: identify which MOO algorithms should have their constraints and/or populations modified; identify which constraints and/or populations should be modified; and how the identified constraints and/or populations should be modified.

Subsequently, a decision is made in step 614 as to whether all of the solution trajectories of the MOO algorithms are in an acceptable general direction. If all of the solution trajectories of the MOO algorithms are not in an acceptable general directions [614:NO], then the "biasing" of the convergence of the solution trajectories is continued. In contrast, if all of the solution trajectories of the MOO algorithms are in an acceptable general direction [614:YES], then step 616 is performed where the "biasing" is ceased so that the MOO algorithms can converge to compatible non-dominated solutions.

Thereafter, the Pareto Fronts, generated by solving the MOO algorithms, are analyzed in aggregate to develop a plurality of best overall network solutions, as shown by step 618. The best overall network solutions can be developed using a case-based reasoning algorithm, an expert system algorithm or a neural network algorithm. The best overall network solutions are then ranked according to a pre-defined criteria, as shown by step 620. A top ranked solution is identified in step 622 for the best overall network solutions that comply with current regulatory policies and/or project/mission policies. Subsequent to completing step 622, step 624 is performed where configuration parameters are computed for protocols of the protocol stack layers that enable implementation of the top ranked solution within the cognitive network. The top ranked solution is implemented in the cognitive network by configuring the network resources (e.g., hardware and software resources of network nodes 302-310 of FIG. 3) thereof in accordance with the configuration parameters, as shown by step 626. Upon completing step 626, step 628 is performed where method 600 ends or other processing is performed.

As a consequence of employing MOO algorithms, the configuration parameters dynamically change based on changes in at least one of a project, a mission, a network topology and an operating environment. Also, the MOO algorithms and/or parameters therefore can be dynamically adjusted in accordance with changes in at least one of network requirements and network conditions. Furthermore, in distributed implementations the computational loading is dynamically partitioned across all active network nodes of the cognitive network based on a number of network nodes, node information density, and system level computational requirements.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for providing a cognitive network, comprising:
   partially solving, by at least one network node of a plurality of network nodes, a plurality of Multi-Objective Optimization ("MOO") algorithms for a plurality of protocol stack layers using initialization parameters generated based on project requirements, where the plurality of MOO algorithms are to be collectively used to optimize performance of the cognitive network;
   monitoring, by at least said network node, a convergence behavior of said MOO algorithms to identify when solutions thereof start to converge toward Pareto-Optimal solutions;
   biasing, by at least said network node, a convergence of a solution trajectory for at least a first MOO algorithm of said MOO algorithms so that compatible non-dominated solutions are generated at each of said plurality of protocol stack layers;
   determining, by at least said network node, a Pareto Front for each protocol stack layer of said plurality of protocol stack layers in a protocol stack by generating all remaining solutions for said plurality of MOO algorithms, where (1) said plurality of MOO algorithms are respectively solved using respective ones of said initialization parameters and (2) at least two of the plurality of MOO algorithms are different for at least two of said plurality of protocol stack layers;
   analyzing, by at least said network node, said Pareto Fronts previously determined for said plurality of protocol stack layers in aggregate to develop a plurality of best overall network solutions;

ranking, by at least said network node, said plurality of best overall network solutions according to a pre-defined criteria;
identifying, by at least said network node, a top ranked solution for said plurality of best overall network solutions that complies with current regulatory and mission policies;
computing, by at least said network node, configuration parameters for protocols of said protocol stack layers that enable implementation of said top ranked solution within said cognitive network; and
dynamically re-configuring network resources of said protocol stack layers in accordance with said configuration parameters.

2. The method according to claim 1, wherein said convergence of said solution trajectory is biased by modifying at least one problem constraint or a population of candidate solutions for said first MOO algorithm.

3. The method according to claim 1, wherein said biasing is performed using an MOO algorithm employing an artificial intelligence-based technique that is independent of said plurality of MOO algorithms.

4. The method according to claim 1, wherein said biasing is based on a hierarchical prioritization of said plurality of protocol stack layers.

5. The method according to claim 1, further comprising ceasing said biasing when solution trajectories for said plurality of MOO algorithms are all in an acceptable direction.

6. The method according to claim 1, wherein the initialization parameters are generated using information comprising at least one of:
information specifying a status and constraints that apply to protocol stack layer resources of at least one network node; and
information concerning resources that are available on each network node of said cognitive network.

7. The method according to claim 1, wherein at least one of said MOO algorithms comprises a biologically inspired particle swarm optimization algorithm.

8. The method according to claim 7, wherein said biologically inspired particle swarm optimization algorithm is used for at least one of a physical layer, a data link layer, and a network layer of the protocol stack.

9. The method according to claim 1, wherein at least one of a number of MOO algorithms and a type of an MOO algorithm to be employed for at least one protocol stack layer of said plurality of protocol stack layers is selected based on requirements of said protocol stack layer and an amount of non-payload inter-node communication.

10. The method according to claim 1, further comprising dynamically changing said configuration parameters based on changes in at least one of a project, a mission, a network topology and an operating environment.

11. The method according to claim 1, wherein at least one of the plurality of MOO algorithms is an inter-processor or inter-node distributed MOO algorithm to be employed for at least one protocol stack layer of said plurality of protocol stack layers.

12. A system, comprising:
a plurality of network nodes comprising electronic circuits collectively configured to
partially solve a plurality of Multi-Objective Optimization ("MOO") algorithms for a plurality of protocol stack layers using initialization parameters generated based on mission requirements, where the plurality of MOO algorithms are to be collectively used to optimize performance of the cognitive network;
monitor a convergence behavior of said MOO algorithms to identify when solutions thereof start to converge toward Pareto-Optimal solutions;
bias a convergence of a solution trajectory for at least a first MOO algorithm of said MOO algorithms so that compatible non-dominated solutions are generated at each of said plurality of protocol stack layers;
determine a Pareto Front for each protocol stack layer of said plurality of protocol stack layers in a protocol stack by generating all remaining solutions for said plurality of MOO algorithms, where said plurality of MOO algorithms are respectively solved using respective ones of said initialization parameters and at least two of the plurality of MOO algorithms are different for at least two of said plurality of protocol stack layers;
analyze said Pareto Fronts previously determined for said plurality of protocol stack layers in aggregate to develop a plurality of best overall network solutions;
rank said plurality of best overall network solutions according to a pre-defined criteria;
identify a top ranked solution for said plurality of best overall network solutions that complies with current regulatory and mission policies;
compute configuration parameters for protocols of said protocol stack layers that enable implementation of said top ranked solution within said cognitive network; and
dynamically re-configure network resources of said protocol stack layers in accordance with said configuration parameters.

13. The system according to claim 12, wherein said convergence of said solution trajectory is biased by modifying at least one problem constraint or a population of candidate solutions for said first MOO algorithm.

14. The system according to claim 12, wherein said convergence of said solution trajectory is biased using an MOO algorithm employing an artificial intelligence-based technique that is independent of said plurality of MOO algorithms.

15. The system according to claim 12, wherein said convergence of said solution trajectory is biased based on a hierarchical prioritization of said plurality of protocol stack layers.

16. The system according to claim 12, wherein said plurality of network nodes cease biasing said convergence of said solution trajectory when solution trajectories for said plurality of MOO algorithms are all in an acceptable direction.

17. The system according to claim 12, wherein the initialization parameters are generated using information comprising at least one of:
information specifying a status and constraints that apply to protocol stack layer resources of at least one network node; and
information concerning resources that are available on each network node of said cognitive network.

18. The system according to claim 12, wherein at least one of said plurality of MOO algorithms comprises a biologically inspired particle swarm optimization algorithm.

19. The system according to claim 18, wherein said biologically inspired particle swarm optimization algorithm is used for at least one of a physical layer, a data link layer, and a network layer of the protocol stack.

20. The system according to claim 12, wherein at least one of a number of MOO algorithms and a type of an MOO algorithm to be employed for at least one protocol stack layer of said plurality of protocol stack layers is selected based on requirements of said protocol stack layer and an amount of non-payload inter-node communication.

21. The system according to claim 12, wherein the electronic circuit of said plurality of network nodes are further configured to dynamically change said configuration parameters based on changes in at least one of a project, a mission, a network topology and an operating environment.

22. The system according to claim 12, wherein at least one of the plurality of MOO algorithms is an inter-processor or inter-node distributed MOO algorithm to be employed for at least one protocol stack layer of said plurality of protocol stack layers.

* * * * *